(12) United States Patent
Fenayon et al.

(10) Patent No.: US 9,140,316 B2
(45) Date of Patent: Sep. 22, 2015

(54) MECHANICAL SYSTEM WITH ONE-WAY CLUTCH, AND ALTERNATOR COMPRISING SUCH A SYSTEM

(71) Applicant: Aktiebolaget SKF, Göteborg (SE)

(72) Inventors: Ludovic Fenayon, Montbazon (FR); Alain Gezault, Vineuil (FR); Torbjorn Hedman, St Cyr sur Loire (FR); Romuald Lescorail, St. Laurent en Gâtines (FR)

(73) Assignee: AKTIEBOLAGET SKF, Gothenburg (SE)

( * ) Notice: Subject to any disclaimer, the term of this patent is extended or adjusted under 35 U.S.C. 154(b) by 29 days.

(21) Appl. No.: 14/036,941

(22) Filed: Sep. 25, 2013

(65) Prior Publication Data

US 2014/0083808 A1  Mar. 27, 2014

(30) Foreign Application Priority Data

Sep. 25, 2012  (FR) ...................... 12 58986

(51) Int. Cl.
| | |
|---|---|
| *F16D 41/07* | (2006.01) |
| *F16D 41/06* | (2006.01) |
| *F16C 19/28* | (2006.01) |
| *F16C 33/58* | (2006.01) |

(52) U.S. Cl.
CPC ............... *F16D 41/06* (2013.01); *F16C 19/28* (2013.01); *F16C 33/588* (2013.01); *F16D 41/07* (2013.01)

(58) Field of Classification Search
None
See application file for complete search history.

(56) References Cited

U.S. PATENT DOCUMENTS

| 2006/0240926 A1* | 10/2006 | Wiesneth et al. ............. 474/166 |
| 2007/0137968 A1* | 6/2007 | Lehmann ........................ 192/45 |
| 2008/0093189 A1* | 4/2008 | Wiesneth et al. ............ 192/45.1 |
| 2008/0230341 A1* | 9/2008 | Barraud et al. ................. 192/45 |
| 2010/0181160 A1* | 7/2010 | Suzuki et al. ............... 192/41 A |

FOREIGN PATENT DOCUMENTS

| DE | 3535795 A1 | 4/1987 |
| DE | 19546584 A1 | 6/1996 |
| DE | 10 2010 047 930 A1 * | 4/2012 |
| FR | 1355768 A | 3/1964 |
| FR | 2726059 A1 | 4/1996 |
| FR | 2747444 A1 | 10/1997 |

* cited by examiner

*Primary Examiner* — Rodney H Bonck
(74) *Attorney, Agent, or Firm* — Brian Peckjian; SKF USA Inc. Patent Dept.

(57) ABSTRACT

A mechanical system with a one-way clutch, such as a motor vehicle alternator pulley, includes an outer first ring and an inner second ring able to move relative to one another in rotation about a central axis and delimit between them, radially with respect to this central axis, an annular housing. The mechanical system includes a free-wheel mechanism having members arranged in the annular housing, and at least one rolling bearing providing rollers arranged in the annular housing. The first and second rings are common to the freewheel mechanism and to the rolling bearing. The members of the free-wheel mechanism are cams in contact with a first race formed by the first ring and a second race formed by the second ring. The first and second races are circular, centered on the axis of rotation and have no ramp.

7 Claims, 3 Drawing Sheets

MECHANICAL SYSTEM WITH ONE-WAY CLUTCH, AND ALTERNATOR COMPRISING SUCH A SYSTEM

CROSS-REFERENCE

This application claims priority to French patent application no. 1258986 filed on Sep. 25, 2012, the contents of which are fully incorporated herein by reference.

TECHNICAL FIELD

The present invention relates to a mechanical system with a one-way clutch, such as a motor vehicle alternator pulley. The invention also relates to an alternator comprising, amongst other things, such a mechanical system, configured as a pulley with a one-way clutch.

BACKGROUND ART

In the known way, a transmission belt drives an outer rim of an alternator pulley which itself drives an input shaft of the alternator. In service, this pulley is subject to variations in speed and torque, notably because of the acyclic operation of the internal combustion engine of a motor vehicle. There are various ways for smoothing out these variations in speed and torque, for example by fitting a one-way clutch (OWC) device, also referred to as a "free wheel" between the hub and the rim of such a pulley. In one direction of rotation, the one-way clutch device transmits torque from the rim to the hub of the pulley, whereas in the other direction of rotation the hub is not driven by the rim.

FR-A-2 726 059 describes a mechanical system of this type in which a free-wheel clutch comprises wedging rollers which are guided in a cage and wedged against wedging ramps formed at the periphery of a ring. Thus, the wedging rollers of the free-wheel clutch interact successively with the wedging ramps of the ring. This prior art dictates the use of a ring provided with ramps, which entails relatively complex operations forming these ramps, requiring qualified personnel and elaborate equipment, resulting in a high cost price. Furthermore, the maximum torque that can be transmitted with this kind of device is relatively low.

These are the disadvantages that the invention more particularly intends to overcome by proposing a novel mechanical system with one-way clutch that allows effective transmission of torque, in one direction of rotation, and freewheel operation in the other direction of rotation, while at the same time offering attractive robustness and an attractive cost price.

SUMMARY

To this end, the invention relates to a mechanical system with one-way clutch, notably motor vehicle alternator pulley, which comprises: an outer first ring and an inner second ring which are able to move relative to one another in rotation about a central axis and delimit between them, radially with respect to this central axis, an annular housing, a free-wheel mechanism comprising members arranged in the annular housing, and at least one rolling bearing comprising rollers arranged in the annular housing. In this mechanism, the first and second rings are common to the free-wheel mechanism and to the rolling bearing. According to the invention, the members of the free-wheel mechanism which are arranged in the annular housing are cams in contact with a first race formed by the first ring and a second race formed by the second ring while the first and second races are circular, centred on the axis of rotation and have no ramp.

By virtue of the invention, the first and second rings can be manufactured in a way that is relatively simple and easy to master, with a particularly attractive cost price, because there is no need to provide ramps on either of these rings. It also turns out that, by comparison with the hardware known from FR-A-2 726 059, a mechanism according to the invention offers improved robustness insofar as it can transmit a higher torque. Furthermore, depending on the geometry of the cams, this mechanism may offer better responsiveness namely may react better to a very rapid change in speed of the driving member, namely the rim of the pulley. Finally, the cams have an effect of damping and filtering high frequency engine acyclic operation.

According to advantageous but non-compulsory aspects of the invention, such a system may incorporate one or more of the following features, considered in any technically permissible combination:

- The system comprises at least two rolling bearings, at least one of which has rollers and the first and second rings being common to the free-wheel mechanism and to the two rolling bearings.
- The system comprises at least two roller bearings arranged, along the central axis, one on either side of the free wheel mechanism.
- Each of the first and second rings is made of a pressed metal strip.
- One surface of the first ring which defines the first race and/or one surface of the second ring which defines the second race is stepped and defines, in addition to the first race and/or the second race, a bearing race for a rolling body belonging to the rolling bearing, the bearing race having a different diameter from the first race and/or from the second race.
- The surface of the first ring which defines the first race and the surface of the second ring which defines the second race are each provided with two shoulders marking the transition between, on the one hand, the first or second race and, on the other hand, two bearing races which are arranged, along the central axis, one on either side of the first or second race.
- The diameters of the two bearing races of the first or of the second ring are respectively less than and greater than the diameter of the first or second race.
- Each cam comprises an outer sliding surface in contact with the first race and an inner sliding surface in contact with the second race, of which the centres of curvature are offset from one another.
- The free-wheel mechanism comprises a cage and an elastic return member for returning each cam to its position.

The invention can be implemented using any type of mechanical system with one-way clutch, for example an alternator or an air-conditioning compressor. However, it finds a particular application in the field of motor vehicle alternators. This is why another subject of the invention is an alternator comprising a mechanical system as mentioned hereinabove, configured as a pulley with one-way clutch.

BRIEF DESCRIPTION OF THE DRAWINGS

The invention will be better understood and other advantages thereof will become more clearly apparent in the light of the following description of one embodiment of an alternator pulley according to the principle of the invention, which embodiment is given purely by way of example and made with reference to the attached drawings in which.

DETAILED DESCRIPTION OF THE INVENTION

Figure 1:
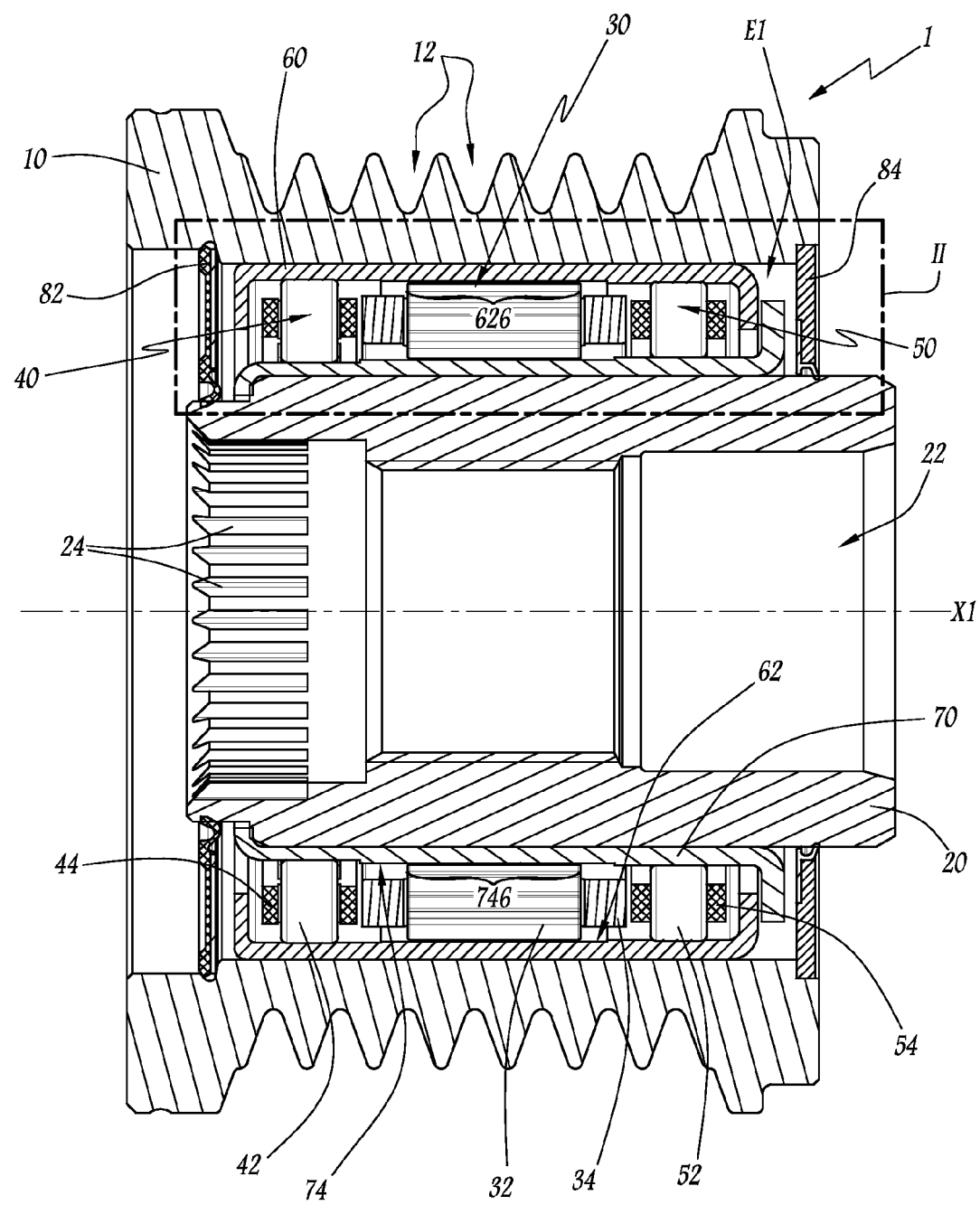
FIG. 1 is an axial section through a mechanical system according to the invention, of the alternator pulley type, comprising rolling bearings and a one-way clutch device which are arranged between a rim and a hub.
Figure 2:
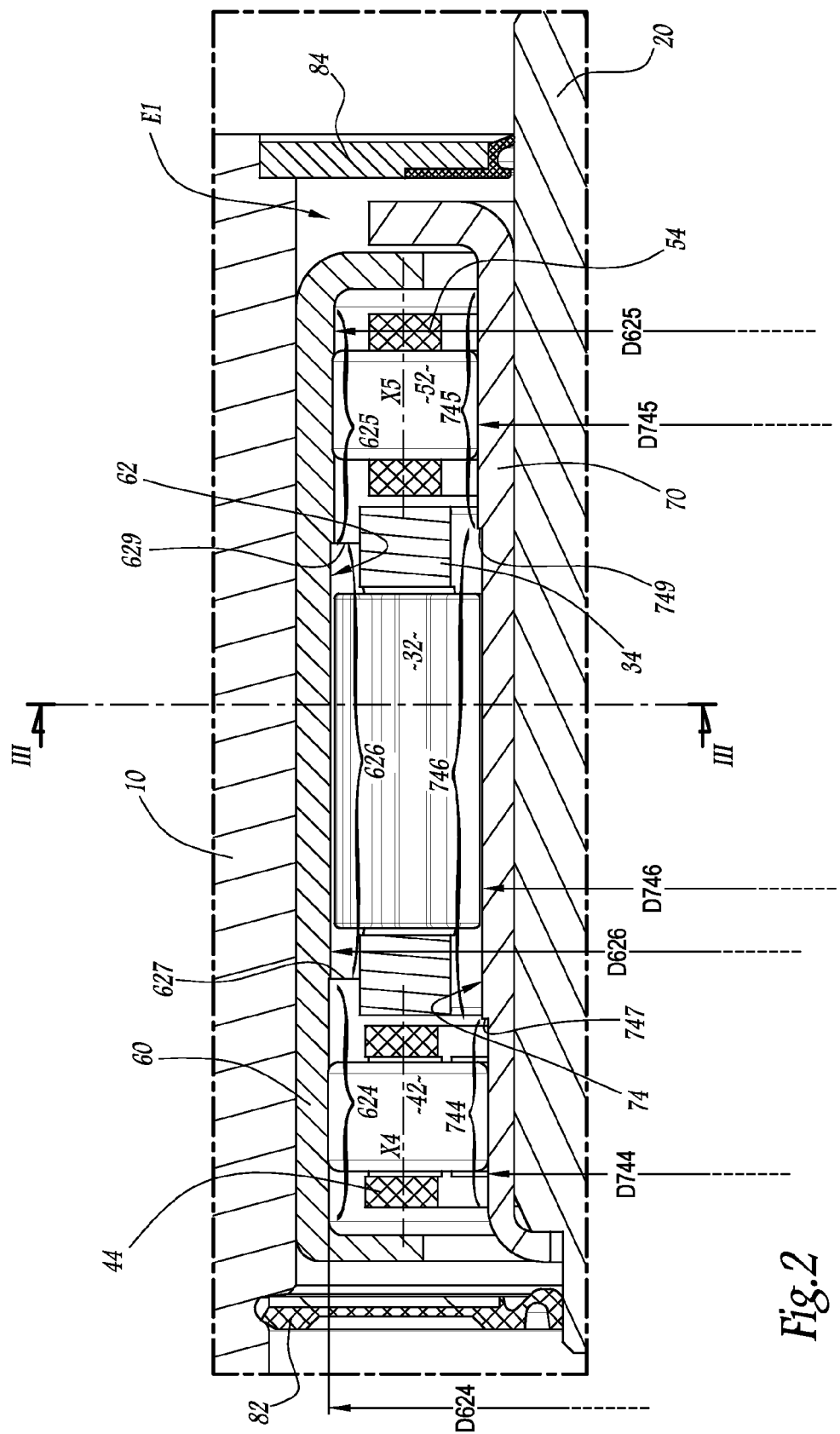
FIG. 2 is a larger scale view of detail II in FIG. 1.
Figure 3:
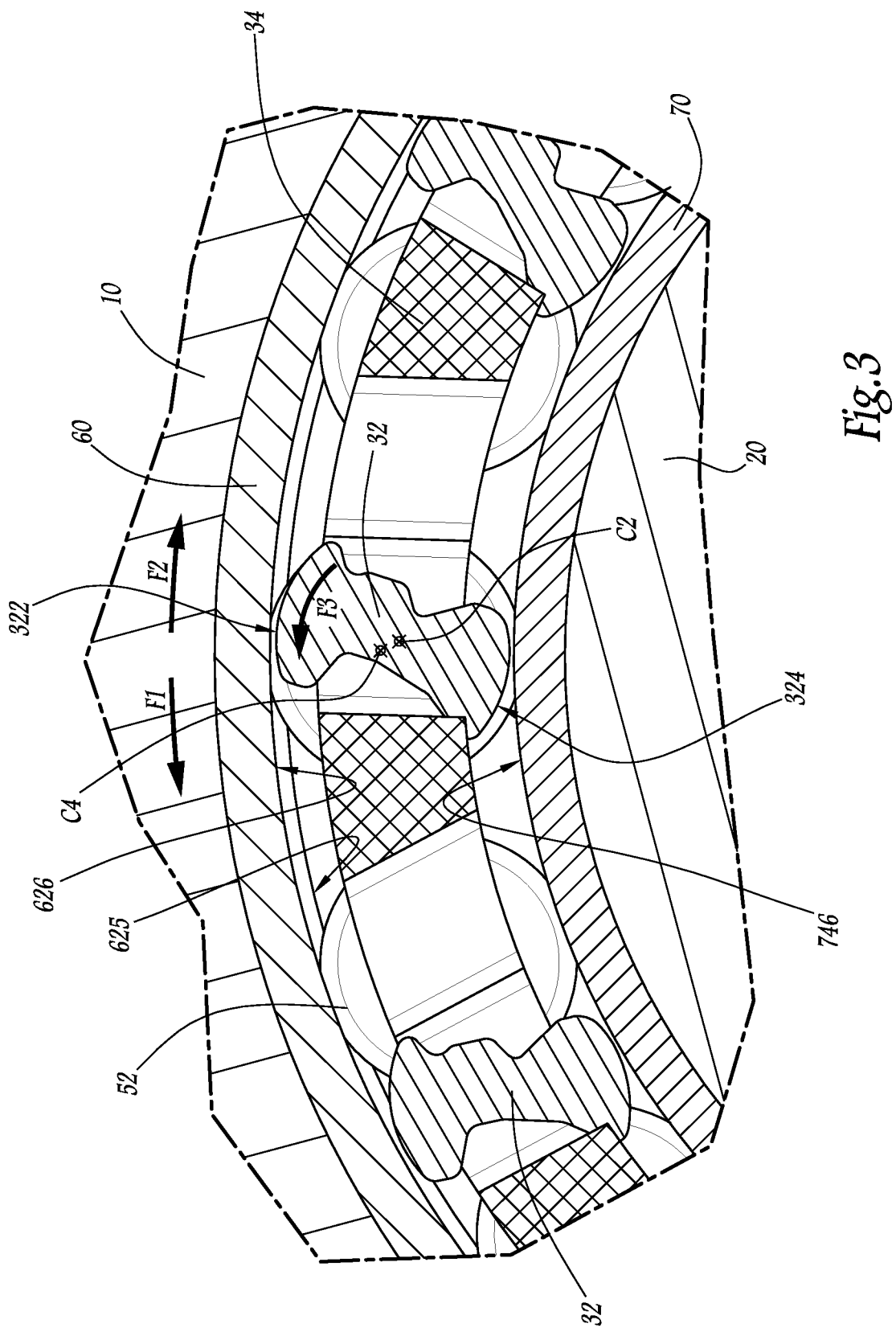
FIG. 3 is a larger scale part section on III-III of FIG. 2.

FIGS. 1 to 3 depict a pulley 1 according to the invention. This pulley 1 is designed to be fitted to a motor vehicle alternator, which for the sake of simplicity has not been depicted.

The pulley 1 is centred on a central axis X1 and comprises an outer rim 10, an inner hub 20, a one-way clutch device or free-wheel mechanism 30, and two rolling bearings 40 and 50 arranged one on either side of the device 30 along the axis X1.

The device 30, the rolling bearings 40 and 50 and the rings 60 and 70 are arranged inside an annular space E1 which is defined radially between the rim 10 and the hub 20, both of which are able to move relative to one another in rotation about the axis X1, by virtue of the rolling bearings 40 and 50.

The rolling bearings 40 and 50 are identical and each comprise a series of rollers 42 and 52 respectively, and respective cages 44 and 54. The rollers 42 and 52 are cylindrical of circular cross section centred on an axis X4 and X5 respectively, parallel to the axis X1. As an alternative, other rolling bearings with rolling bodies can be used in place of the rolling bearings 40 and 50, for example ball bearings.

The pulley 1 also comprises an outer ring 60 produced by pressing a metal sheet and which is secured, at least in terms of rotation, to the rim 10. The pulley 1 also comprises an inner ring 70, likewise formed from a pressed metal sheet and secured, at least in terms of rotation, to the hub 20.

The inner radial surface 62 of the ring 60 and the outer radial surface 74 of the inner ring 70 are each circular and centred on the axis X1, in the region of the rollers 42 and 52 along the axis X1, so that they constitute circular bearing races 624, 625, 744 and 745 for these rollers. Thus, the lateral parts of the rings 60 and 70 forming the races 624, 625, 744 and 745 belong to the rolling bearings 40 and 50.

The pulley 1 also comprises two seals 82 and 84 which are fixed to the rim 10 and each provided with a lip in sliding contact against an outer radial surface of the hub 20.

The free-wheel mechanism 30 for its part comprises wedging cams 32 which are held in place between the rings 60 and 70 by a cage 34.

The cams 32 press respectively against a central zone 626 of the surface 62 and a central zone 746 of the surface 74, these central zones being circular, centred on the axis X1 and having no ramp or similar relief. The zone 626 therefore forms a cylindrical race of circular cross section, centred on the axis X1, for contact between the cams 32 and the ring 60. It is situated, axially along the axis X1, between the bearing races 624 and 625 for the rollers 42 and 52.

In the same way, the central zone 746 of the surface 74 is defined, axially along the axis X1, between the bearing races 744 and 745 for the rollers 42 and 52. This central zone 746 constitutes a contact race for the cams 32. This contact race is cylindrical of circular cross section, centred on the axis X1.

The central parts of the rings 60 and 70 forming the races 626 and 746 belong to the free-wheel mechanism 30.

The surface 62 is formed by the races 624, 625 and 626, while the surface 74 is formed by the races 744, 745 and 746.

Thus, the rings 60 and 70 belong in part to the mechanism 30 and in part to the rolling bearings 40 and 50. They are therefore common to the three mechanisms 30, 40 and 50 arranged in the space E1.

A shoulder 627 is formed on the surface 62 between the races 624 and 626, so that the diameter D624 of the race 624 is greater than the diameter D626 of the race 626. Another shoulder 629 separates the races 625 and 626, so that the diameter D625 of the race 625 is less than the diameter D626.

Likewise, two shoulders 747 and 749 are provided respectively on the surface 74 between the races 744 and 746 on the one hand, and 745 and 746 on the other.

The diameters D744 and D745 of the races 744 and 745 are respectively less than and greater than the diameter D746 of the race 746.

The shoulders 627, 629, 747 and 749 make it possible to ensure that the races 624, 625, 626, 744, 745 and 746 are cylindrical, without risk of becoming conical, despite the relatively long axial length of the surfaces 62 and 74.

As an alternative, the direction of the shoulders may be reversed. In another alternative, the shoulders of one of the surfaces 62 or 74 may be the opposite of one another. In another alternative, just one shoulder may be provided on each surface 62 or 74, as may more than two shoulders.

Each of the rings 60 and 70 is particularly simple to produce, notably because of the absence of any ramp on the surfaces 62 and 74, which means that the pulley 1 can have an attractive cost price.

The geometry of a cam 32 is more clearly apparent from FIG. 3. This cam comprises an outer sliding surface 322 intended to be in contact with the first race 626, and a second, inner, sliding surface 324 intended to be in contact with the second race 746. The respective centres of curvature C2 and C4 of the surfaces 322 and 326 are offset from one another, allowing each cam 32 to have an oscillatory movement which allows the ring 60 to rotate relative to the ring 70 in the direction of the arrow F2, but locks a reverse movement in the direction of the arrow F1 because the cams 32 would then rock in the direction of the arrow F3, causing the two rings 60 and 70 to become wedged and locked relative to one another.

Moreover, the clutch device 30 may comprise a sprung element, not depicted, which applies to each cam 32 an elastic force that tends to return each cam to a mean position.

The rim 10 is equipped with external grooves 12 configured to partially accommodate a belt, not depicted, for transmitting a torque, whereas the hub 20 defines an internal bore 22 configured to accept the shaft of an alternator, and having splines 24 that facilitate the transmission of torque from the hub 20 to the shaft of the alternator.

Thus a transmission torque can be transmitted from the rim 10 to the hub 20, namely from the belt that has not been depicted to the shaft that has not been depicted of the alternator when the rim is rotating in the direction of the arrow F1 in FIG. 3 with respect to the shaft 20. By contrast, a torque in the opposite direction, namely a torque corresponding to a movement of the rim 10 in the direction of the arrow F2 in FIG. 3 is not transmitted because the cams 32 of the one-way clutch device 30 then slide along the races 626 and 746.

Because the constituent parts of the clutch device 30, namely the cams 32 and the surfaces 626 and 746, work essentially in compression when torque is being transmitted between the rim 10 and the hub 20, the pulley 1 is capable of transmitting a relatively high torque, higher than in the case where one of the races 626 or 746 has ramps, as envisaged in FR-A-2 726 059, such ramps having a tendency to deform under load.

Furthermore, the responsiveness of the pulley 1, which means to say its ability to transmit torque rapidly is improved, notably under conditions of high frequency acyclic operation of the engine that drives the belt that has not been depicted and the rim 10. This is because the cams 32 have a damping effect and allow this acyclic operation to be filtered out.

According to another alternative form of the invention, which alternative form has not been depicted, the system 1 may comprise more than two rolling bearings. Furthermore, two rolling bearings may be arranged side by side, on the same side of the free-wheel mechanism 30. It is possible for the rolling bearings not all to be of the roller bearing type.

The technical features of the embodiments and alternative forms envisaged hereinabove may be combined with one another.

The invention claimed is:

1. A mechanical system providing a one-way clutch for a motor vehicle alternator pulley, the system comprising:
   an outer first ring and an inner second ring able to move relative to one another in rotation about a central axis and delimiting between them, radially with respect to the central axis, an annular housing;
   a free-wheel mechanism having members arranged in the annular housing; and
   at least two rolling bearings each including rollers arranged in the annular housing along the central axis, one on either side of the free-wheel mechanism, the outer first ring and the inner second ring common to the free-wheel mechanism and to the at least two rolling bearings,
   wherein the members of the free-wheel mechanism arranged in the annular housing include cams in contact with a first race formed by the outer first ring and a second race formed by the inner second ring and the first and second races are circular, centered on the axis of rotation and have no ramp, and
   wherein a surface of the outer first ring which defines the first race and a surface of the inner second ring which defines the second race are each provided with two shoulders marking the transition between the first or second race and two bearing races which are arranged, along the central axis, one on either side of the first or second race.

2. The system according to claim 1, wherein each of the outer first ring and the inner second ring is made of a pressed metal strip.

3. The system according to claim 1, wherein the surface of the outer first ring defines the first race and/or the surface of the inner second ring defines the second race is stepped and further defines, a bearing race for a rolling body belonging to the rolling bearing, the bearing race having a different diameter from the first race and/or from the second race.

4. The system according to claim 1, wherein the diameters of the two bearing races of the outer first ring or of the inner second ring are respectively less than and greater than the diameter of the first or second race.

5. The system according to claim 1, wherein each cam includes an outer sliding surface in contact with the first race and an inner sliding surface in contact with the second race, of which the centers of curvature are offset from one another.

6. The system according to claim 1, wherein the free-wheel mechanism provides a cage.

7. An alternator, comprising:
   a mechanical system having an outer first ring and an inner second ring able to move relative to one another in rotation about a central axis and delimiting between them, radially with respect to the central axis, an annular housing;
   a free-wheel mechanism having members arranged in the annular housing; and
   at least two rolling bearings each including rollers arranged in the annular housing along the central axis, one on either side of the free-wheel mechanism, the outer first ring and the inner second ring common to the free-wheel mechanism and to the at least two rolling bearings,
   wherein the members of the free-wheel mechanism arranged in the annular housing include cams in contact with a first race formed by the outer first ring and a second race formed by the inner second ring and the first and second races are circular, centered on the axis of rotation and have no ramp,
   wherein a surface of the outer first ring which defines the first race and a surface of the inner second ring which defines the second race are each provided with two shoulders marking the transition between the first or second race and two bearing races which are arranged, along the central axis, one on either side of the first or second race, and
   wherein the mechanical system is configured as a pulley with a one-way clutch.

* * * * *